US009679096B2

(12) United States Patent
Blondel et al.

(10) Patent No.: US 9,679,096 B2
(45) Date of Patent: Jun. 13, 2017

(54) METHOD FOR RETRIEVING A WIRING SCHEMATIC OF AN ELECTRICAL INSTALLATION

(71) Applicant: Schneider Electric Industries SAS, Rueil Malmaison (FR)

(72) Inventors: Charles Blondel, Grenoble (FR); Grace Gandanegara, Gieres (FR); Roland Goutay, St Nazaire les Eymes (FR); Yann Herriot, Voiron (FR)

(73) Assignee: SCHNEIDER ELECTRIC INDUSTIRES SAS, Rueil-Malmaison (FR)

( * ) Notice: Subject to any disclaimer, the term of this patent is extended or adjusted under 35 U.S.C. 154(b) by 85 days.

(21) Appl. No.: 14/676,072

(22) Filed: Apr. 1, 2015

(65) Prior Publication Data
US 2015/0286769 A1 Oct. 8, 2015

(30) Foreign Application Priority Data

Apr. 2, 2014 (FR) ...................................... 14 52911

(51) Int. Cl.
*G06F 17/50* (2006.01)
*H02B 3/00* (2006.01)

(52) U.S. Cl.
CPC ........ *G06F 17/5077* (2013.01); *G06F 17/509* (2013.01); *G06F 17/5081* (2013.01); *H02B 3/00* (2013.01); *G06F 2217/36* (2013.01); *G06F 2217/74* (2013.01)

(58) Field of Classification Search
CPC ....................................................... G06F 17/50

USPC ......................................................... 716/112
See application file for complete search history.

(56) References Cited

U.S. PATENT DOCUMENTS

| 2008/0013227 A1* | 1/2008 | Mernyk | H02H 3/335 |
| | | | 361/42 |
| 2014/0254050 A1* | 9/2014 | Haines | G01R 31/3277 |
| | | | 361/42 |

FOREIGN PATENT DOCUMENTS

DE 198 10 115 A1 9/1999

OTHER PUBLICATIONS

U.S. Appl. No. 14/693,095, filed Apr. 22, 2015, Penkov, et al.
French Preliminary Search Report issued Jan. 9, 2015 in French Application 14 52911, filed on Apr. 2, 2014 (with English Translation of Catagories of Cited Documents).

* cited by examiner

*Primary Examiner* — Thuan Do
(74) *Attorney, Agent, or Firm* — Oblon, McClelland, Maier & Neustadt, L.L.P.

(57) ABSTRACT

A method for reconstituting a diagram of an electrical installation including a plurality of electrical elements connected to a power source via protective elements arranged in an electrical panel. The wired electrical elements of the installation are identified using the electrical panel. The tree structure of the electrical connections of the elements identified and the position of each element in the arborescence are automatically determined. An electrical diagram of the installation is deduced using the tree structure of the electrical connections and the position of each element in the arborescence.

10 Claims, 10 Drawing Sheets

FIG. 9D cb3 not directly downstream of cb1

FIG. 10A cb4 downstream of cb1 !

METHOD FOR RETRIEVING A WIRING SCHEMATIC OF AN ELECTRICAL INSTALLATION

TECHNICAL FIELD

The invention relates to the field of renovating existing electrical installations and relates more specifically to a method for reconstituting a diagram of an electrical installation comprising a plurality of electrical elements arranged in an electrical panel, such as switches, circuit protectors, disconnect switches or circuit breakers.

The invention also relates to a device for reconstituting a diagram of an electrical installation comprising a plurality of electrical elements arranged in an electrical panel.

The invention also relates to a test module integrated into the device according to the invention, and a computer programme, stored on a medium, comprising instructions in order to implement the steps of the method according to the invention when it is executed on a computer.

The invention is applied more particularly, but not exclusively, to existing electrical installations for which the electrical diagram is incomplete or is no longer available in order to update the electrical panel.

PRIOR ART

A recurring difficulty encountered when renovating or updating an electrical installation, is to be able to reconstitute the electrical diagram of the existing installation of which the diagram is incomplete or is no longer available. Indeed, for old electrical panels, 20 or 30 years old for example, the electrical diagram of the installation either does not exist, or is very incomplete due to the fact that it was not updated to take into account modifications in safety standards or the adding of electrical elements to the installation. However, before renovating an existing installation, it is indispensable to know the current electrical diagram for these. Visually and manually following the wires is long and risky, and even impossible, due to the fact that the wires often pass in ducting elements, behind frames, or in the vicinity of live parts. Moreover, due to the necessity of the continuity of the operation of the establishment powered by the installation to be renovated, it is not always possible to cut off, even partially, the electrical current in order to test the circuits of the electrical panels and even less for dismounting the electrical cabinet of this installation. In such a situation, the installer must manually reconstitute the electrical diagram of the cabinet on site, before being able to reconstitute it in his workshop.

The current methods used by installers to reconstitute an electrical diagram consist in visually identifying the cables that connect the electrical elements to the components of the electrical panel, and in verifying the electrical continuities between each component of the cabinet with network testers by injecting a signal into the circuit and by detecting this signal via a contactless capacitive sensor.

Figure 1:
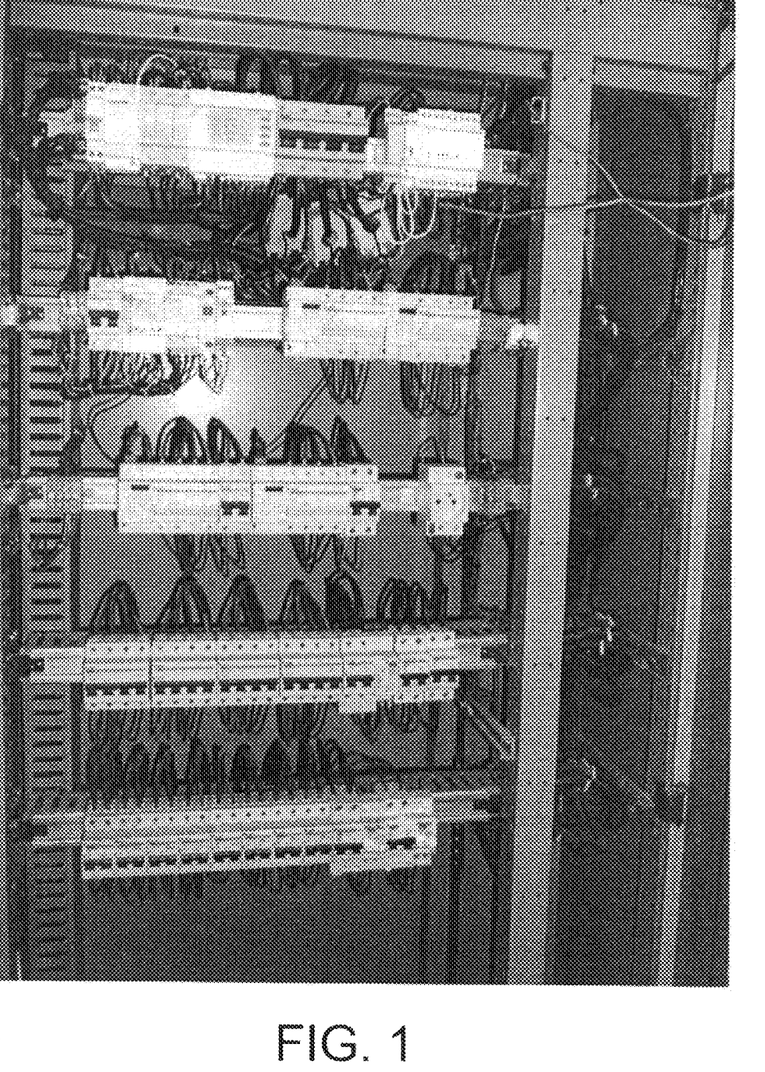
FIGS. 1 and 2 show images of electrical panels of an existing installation.
Figure 2:
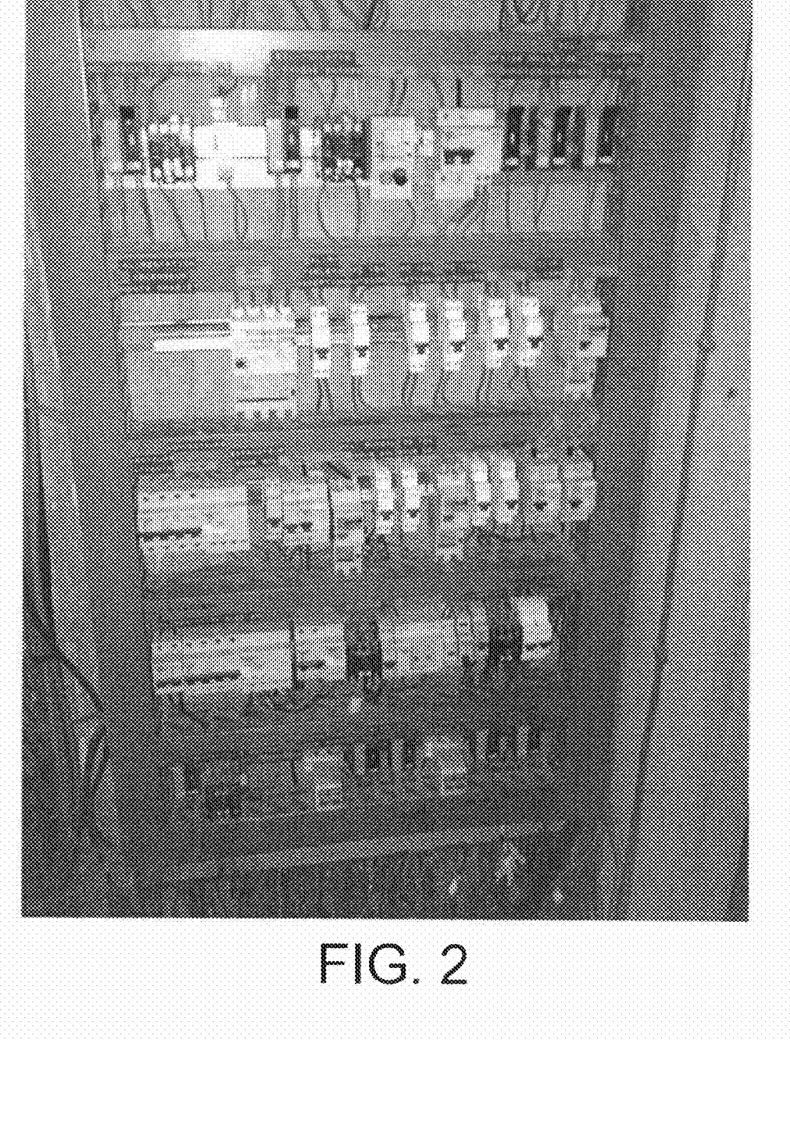

A problem with these methods stems, on the one hand, from the fact that the visual and manual identification of the cables if difficult, and even impossible, due to the fact that they are often hardly visible as they are integrated into ducting elements or strands, or masked by rails, traverse such as shown in FIGS. 1 and 2, and on the other hand, due to the fact that when the current cannot be interrupted, the installer must work in the vicinity of live parts, inside the cabinet; the wearing of gloves and personal protective equipment, which is then indispensable, substantially complicates the manipulation of the cables in order to manually "follow" the wire and their visual identification.

Furthermore, for the reasons indicated hereinabove, the risk of error is substantially increased during a visual and manual identification. As such, when replacing an old cabinet with a new one, if the production is not compliant, the consequences can be very severe when the power is restored (short circuits, destruction of equipment, etc.). Finally, with these methods, it was observed that the average time required for a cabinet with about fifty elements is about 2 man-days.

Moreover, the verification of the electrical continuities between each component of the cabinet with capacitive tester makes it possible solely to check for the presence or the absence of an electrical link between A and B without indicating the relative positions of the elements in the electrical installation. In addition, the signal of the testers has to be adjusted very finely in order to allow for a result, because if it is too strong, it reloops across the entire panel and therefore does not allow the sensor to discriminate it between several close leading-out wires, and if it is too weak, it will not be detected. Because of this, as many tests must be carried out as there are equipotential bonding connections possible, which can quickly become impossible to be carried out. As such for example for 50 elements present in a panel, 50×49=2450 measurements must theoretically be taken.

This work can be very long, meticulous and expensive.

A purpose of the invention is to overcome the disadvantages described hereinabove.

DISCLOSURE OF THE INVENTION

The purpose of the invention is achieved by means of a method and of a device making it possible to automatically reconstruct a diagram of an electrical installation comprising a plurality of elements arranged in an electrical panel connected to a source of power.

The method according to the invention comprises the following steps:

identifying the wired electrical elements of the installation using the electrical panel, automatically determining the tree structure of the electrical connections of the elements identified and the position of each element in said tree structure, deducing an electrical diagram of the installation using the tree structure of the electrical connections and the position of each element in said tree structure.

According to the invention, the determination of the tree structure of the electrical connections comprises the following steps:

locating at least one output terminal and at least one input terminal on each element identified, testing the electrical continuity between the output of a first element identified and the input of a second element identified, determining the relative position of the second element with respect to the first element.

As such, thanks to the invention, it is possible to automatically reconstruct the diagram of an electrical installation for which the initial diagram is lost or incomplete in a reduced timeframe without interruption of the electrical power supply of the elements.

According to the invention, the electrical continuity between the output terminal of the first element identified and the input terminal of the second element identified is verified by a detection of a current injected over the output terminal of the first element and the relative position of the second element with respect to the first element is determined by a current measurement at a test point located downstream of said output terminal of the first element.

The invention as such makes it possible to detect, not only the electrical connections between the elements of the electrical panel, but also makes it possible to locate the relative position of the elements connected in the installation without manually following the wires, but only by injecting a direct current or an alternating current over the output terminal of a first element identified and by taking a current measurement at the test point located downstream of the output terminal of this first element.

BRIEF DESCRIPTION OF THE DRAWINGS

Other characteristics and advantages of the invention shall appear in the following description, taken by way of an unrestricted example, in reference to the annexed figures wherein.

DETAILED DISCLOSURE OF PARTICULAR EMBODIMENTS

The invention shall be described in the framework of an application for renovating an existing electrical installation.

FIGS. 1 and 2 show respectively photos of the electrical panels of two electrical installations to be renovated comprising each one of the electrical elements such as switches, circuit protectors, disconnect switches or circuit breakers, connected by cables dissimulated behind rails in ducting elements. In order to reconstitute the electrical diagrams of these installations, it is necessary to carry out tests in order to check the electrical continuity and the upstream/downstream direction between the electrical connections of the elements of the panel.

To this effect, a first phase of the method according to the invention consists in identifying and in locating the wired electrical elements using photos of FIGS. 1 and 2 in order to recognise the elements of the electrical panel one-by-one. The identification of these electrical elements can be carried out manually. However the manual identification of the various elements can be meticulous. As such, the identification is preferably carried out automatically using photos of the electrical panels by image recognition software which provides the operator with a general diagram of the electrical panel that shows the various elements numbered with their respective inputs and outputs. The processing of the photos of the electrical panel also provides the type and the brand of each element.

A second phase of the method consists in taking measurements in order to test the continuity and the upstream/downstream position between the output of an element, and the input of another element. The order and the number of the tests to be carried out are calculated by a computer application (called App_RecoSchema in the rest of the description) which is based on the analysis of the photos of the electrical panel. For all of the tests, App_RecoSchema designates a reference point (called REF in the rest of the description) representing an output connection of an element, and a measurement point (called MES in the rest of the description) representing an input connection of an element. App_RecoSchema suggests to the operator, via a man-machine interface, reference and measurement points to be tested.

The user carried out the tests requested by App_RecoSchema which will reconstitute the electrical diagram using the test results until all of the elements are correctly located in the diagram.

App_RecoSchema cooperates with an image processing module that is adapted to identify the wired electrical elements of the installation using photos of each row of the electrical panel, a test module suited for verifying the electrical continuity between the output of a first element identified and the input of a second element identified and for determining the relative position of the second element with respect to the first element.

In order to perform the tests, the operator downloads App_RecoSchema to a tablet or a portable computer and takes a photo of each row of the electrical panel. The photos are analysed by the image processing module. The latter returns a panorama of the electrical panel, with the elements cropped and numbered from 1 to N. The user checks that all of the elements are present. He can then "manually" add a missing element, and change or fill in the references or the properties of the elements. A colour code can reflect the level of confidence of the software in the automatic determination of the elements using the photo, and therefore direct the user in his verifications. Once the photo architecture of the panel is validated, a calculation model of App_RecoSchema creates a map of the elements, showing the reference and the inputs-outputs for each element. Before launching the tests, App_RecoSchema asks the user if he can beforehand enter information that could be easy to determine visually, such as for example, Head circuit breaker, elements connected to the same comb, etc.

Figure 3:
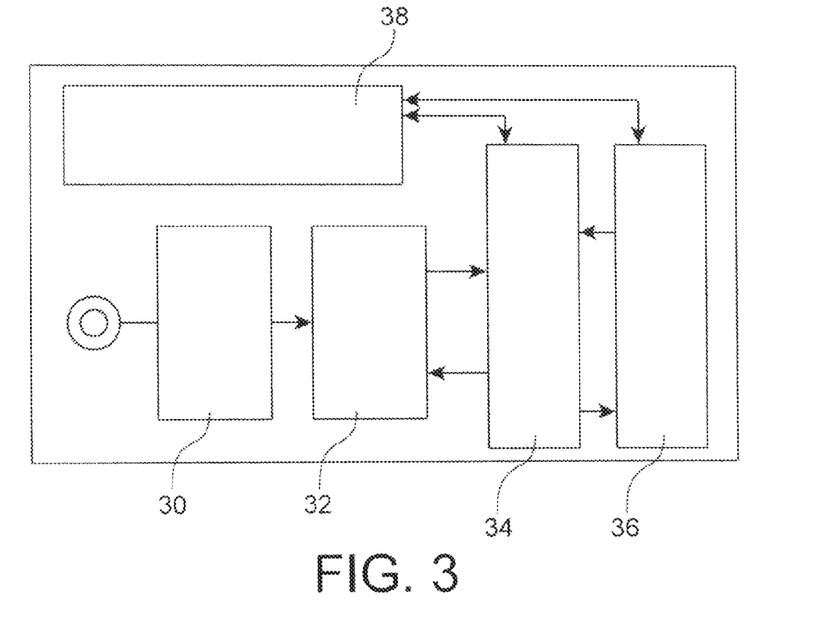
FIG. 3 diagrammatically shows a device for implementing the method according to the invention.

FIG. 3 diagrammatically shows a device for implementing the method according to the invention.

This device comprises an image capturing unit 30, an image processing unit 32 suited for identifying the wired electrical elements of the installation using an image of the electrical panel, a test module 34 suited for verifying the electrical continuity between the output of a first element identified and the input of a second element identified and in order to determine the relative position of the second element with respect to the first element, a calculation model 36 suited to automatically determine the tree structure of the electrical connections of the elements identified and the position of each element in said tree structure and in order to generate an electrical diagram of the installation using the determined tree structure.

The electrical continuity between the output of a first element and the input of a second element is verified by means of a first ammeter 42 which detects the presence of a direct or alternating current at the output of the test module 34, and the relative position of the second element with respect to the first element is determined by means of a second ammeter 44 which detects the presence of a direct or alternating current at a test point 46 located downstream of the first element.

The device according to the invention further comprises a communication module 38 intended to transmit the tree structure generated to a remote processing unit comprising a computer programme able to reconstitute the electrical diagram of the installation.

Note that said processing unit can be integrated into the device according to the invention. In this case, the reconstitution of the electrical diagram of the installation using the tree structure of the electrical connections of the elements identified and the position of each element in said tree structure can be produced locally by an installer without having to transmit the tree structure to the remote processing unit. The electrical diagram reconstituted can then be sent to a production unit for manufacturing or supplementing the electrical panel of the installation.

Figure 4:
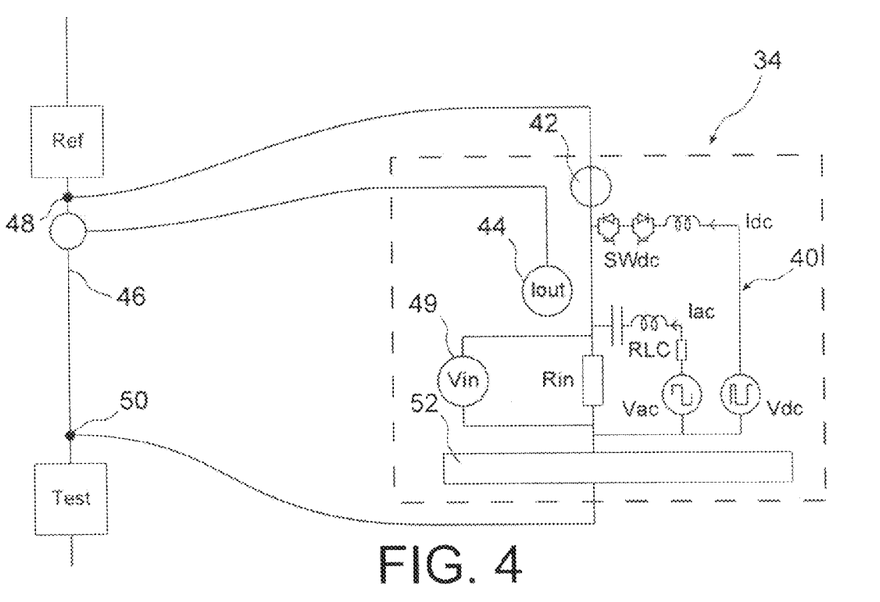
FIG. 4 diagrammatically shows a test step carried out according to the method of the invention.

As is shown in FIG. 4, the test module 34 comprises a current generator 40 able to deliver a direct current Idc or an alternating current Iac, the first ammeter 42 which detects the presence of a direct or alternating current at the output of the test module 34, the second ammeter 44 for measuring the electrical current at the test point 46, and a voltmeter 49 for measuring the voltage between the test point 46 and the input terminal 50 of the second element identified.

In a particular embodiment of the invention, the image capturing unit 30, the image processing unit 32, the test module 34, the calculation model 36 and the communication module 38 are integrated into a tablet further comprising a memory that comprises a man-machine interface (MMI) intended to guide the installer in the order of the measurements to be taken, so as to automatically reconstitute the diagram, by limiting the number of measurements required.

During operation, App_RecoSchema suggests to the operator, via the MMI, a series of tests to be carried out by indicating the point REF 48 that corresponds to the output terminal of the element whereon the operator attaches a test clip of the tester, with the points MES 50 corresponding to a series of input terminals of elements, whereon the operator will apply the measuring touch point of the tester. The results of the measurements are displayed on an interface 52. The user directly enters the measurement point concerned on the photo. Once the series of tests is complete, App_RecoSchema sends the results to the Cloud SE which then in return delivers the diagram for each phase. In the case of an absence of an internet connection, the results are stored in a memory (internal or external).

After analysis, the operator superposes the diagram with the photo of the panel in order to detect any anomalies then validates the diagram which can be sent to the customer via internet.

Figure 5:
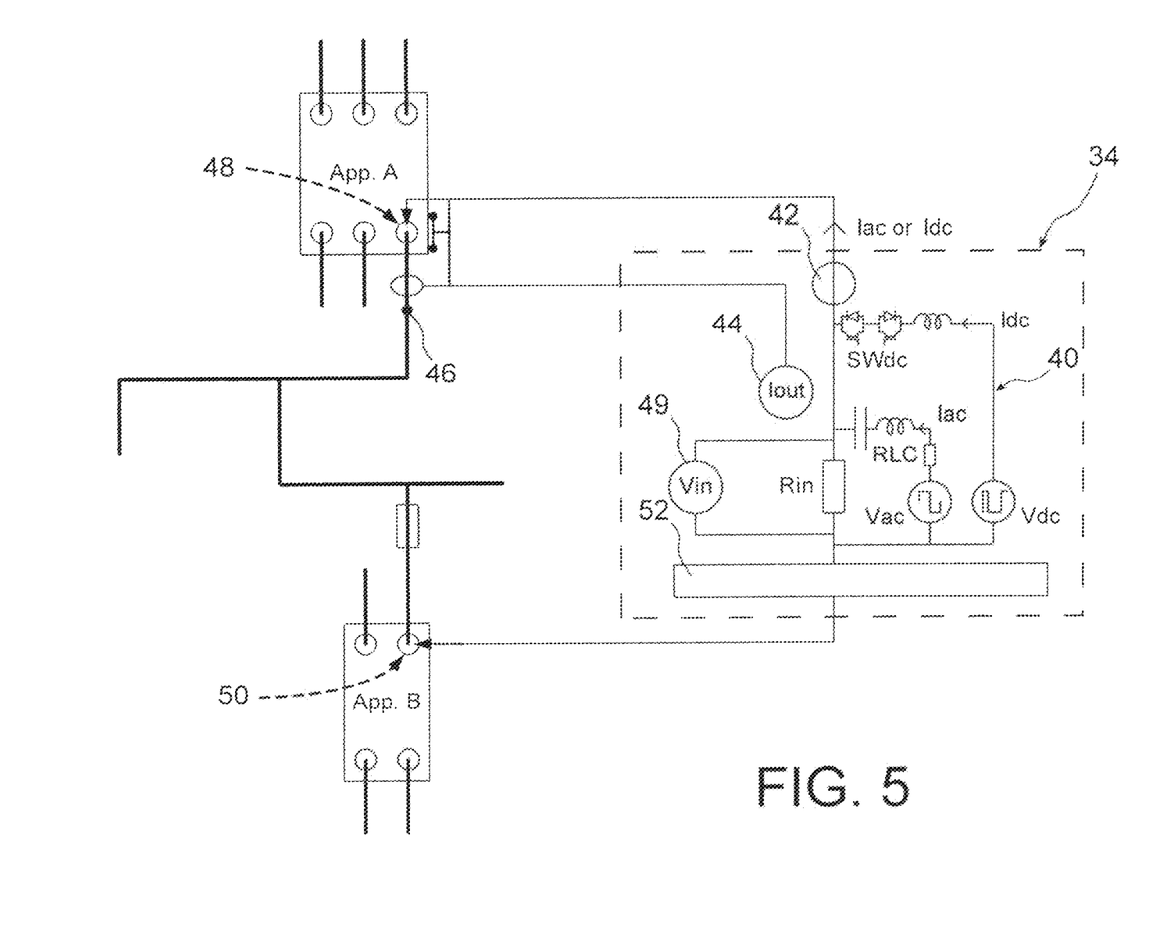
FIG. 5 diagrammatically shows a first measurement example according to the invention.

FIG. 5 shows a first example of use of the test module 34 allowing the operator to detect an electrical continuity between the output 46 of a first element identified AppA and the input 50 of a second element identified AppB and to check that the second element identified AppB is downstream of the first element identified AppA.

Using one of the photos of FIG. 1 or 2, App_RecoSchema provides a diagram, which is displayed on the screen of the tablet or of the computer of the operator, indicating the point REF 48 on App A, the point MES 50 on App B, and the test point 46 located downstream of the point REF 48. In order to verify the electrical continuity between the point REF 48 and the point MES 50, the operator carries out the following operations:

he attaches a test contact on the terminal REF 48, a test clip on the point REF 46 and applies the touch point MES on the point MES 50.

A voltage measurement is taken by the voltmeter 49. This measurement makes it possible to immediately observe whether the point REF 48 and the point MES 50 are located on two different phases (220V or 400V). If this is the case, it is not necessary to inject a current on the terminal REF 48.

However, if the voltmeter 49 indicates no voltage, a current Idc is then injected on the output terminal REF of the first element.

If no current is detected at the output of the test module 34 by the ammeter 42, this means that the output terminal REF 48 of the first element and the input terminal MES 50 of the second element are on different electrical lines and that there is no electrical continuity between the first element and the second element.

However, if the terminal REF 48 and the terminal MES 50 are on the same electrical line, the operator checks that the current is present at point 46 downstream of the terminal REF 48.

If there is a current at point 46, then the terminal MES 50 is downstream of the terminal REF 48.

If there is no current at point 46, then the terminal MES 50 is not downstream of the terminal REF 48.

Figure 6:
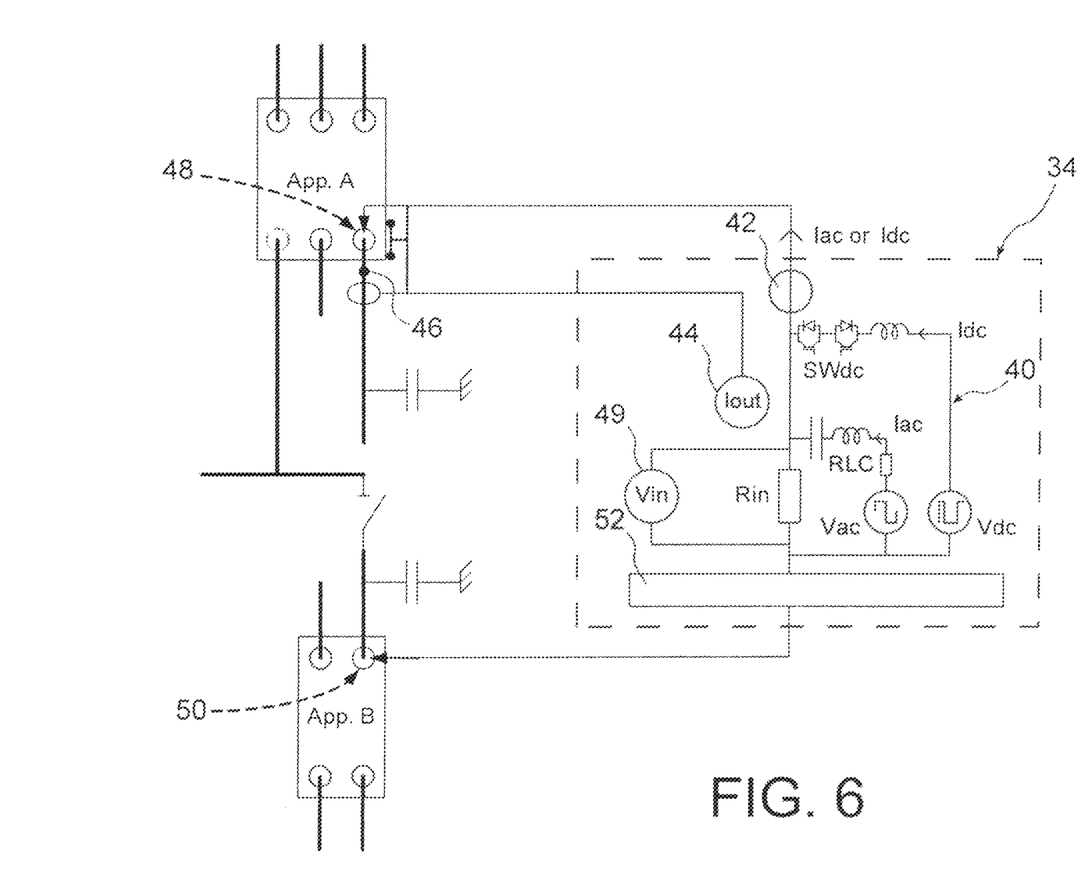
FIG. 6 diagrammatically shows a second measurement example according to the invention.

FIG. 6 shows a second example of use of the test module 34 that allows the operator to conclude that the point MES 50 is not connected to the point REF 48.

In this example, due to the fact that AppB and AppA are disconnected, and due to the presence of filter capacitors, the operator successfully injected an alternating current Iac and measures the current at the test point 46.

If the ammeter indicates this current on Iout, the operator considers the case where a current can flow through filter capacitors to the ground, and to make sure of this, he closes the SWdc switch, injects a direct current Idc at point REF 48, and measures a current Iout at point 46. If the voltmeter 49 indicates a voltage that increases with the flow of the current, the operator concludes that the alternating current Iac was effectively flowing via the filter capacitors to the ground and that there is no electrical continuity between the points MES and REF.

Figure 7:
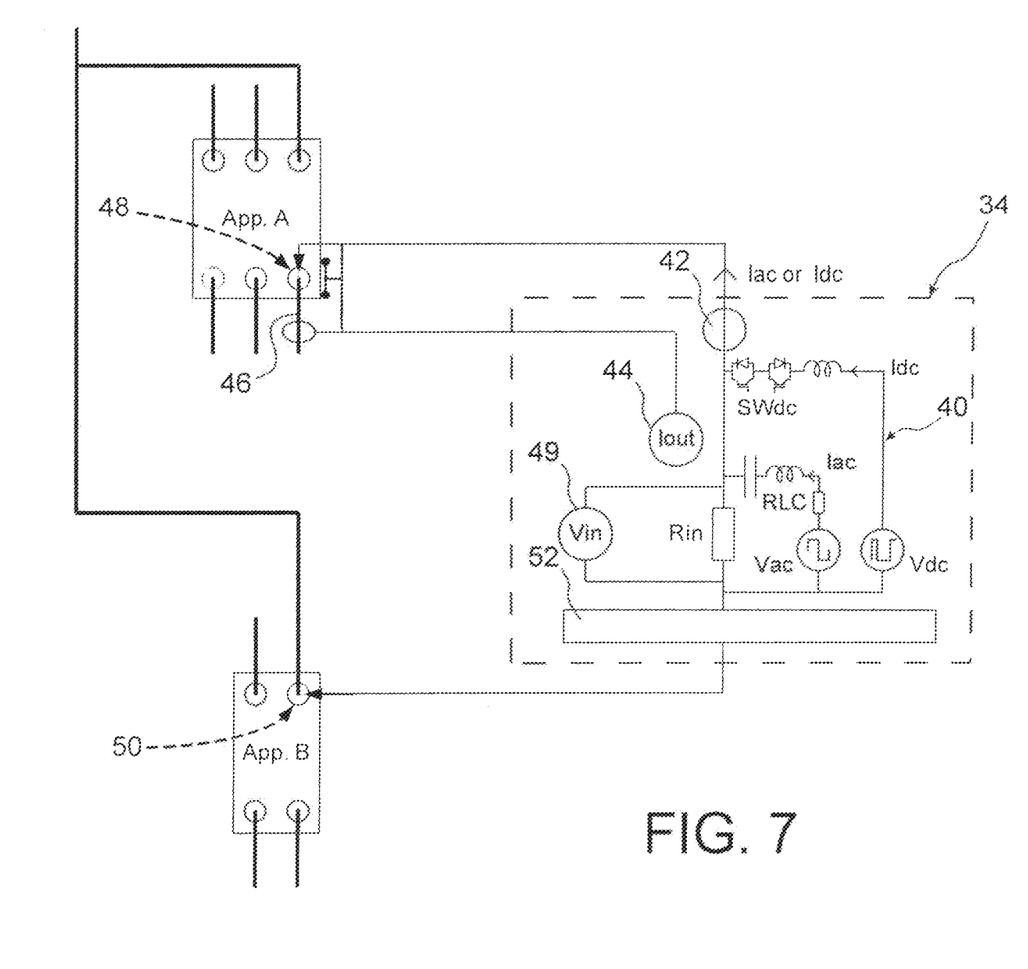
FIG. 7 diagrammatically shows a third measurement example according to the invention.
Figure 8A:
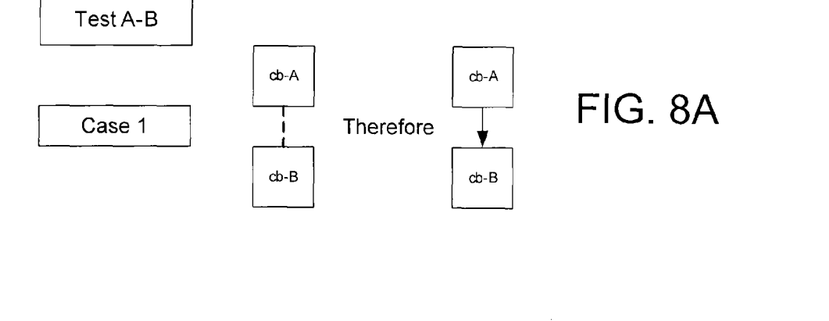
FIG. 8A-8D diagrammatically shows the steps of an example of an algorithm that makes it possible to obtain an electrical diagram of a panel using tests carried out by an operator.
Figure 8B:
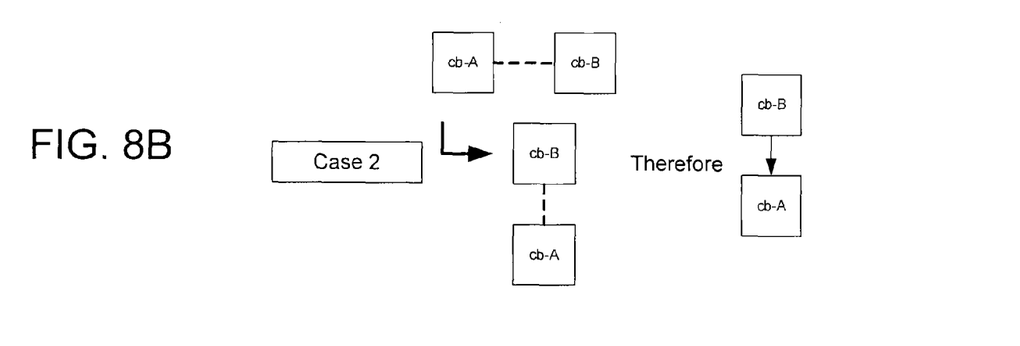
Figure 8C:
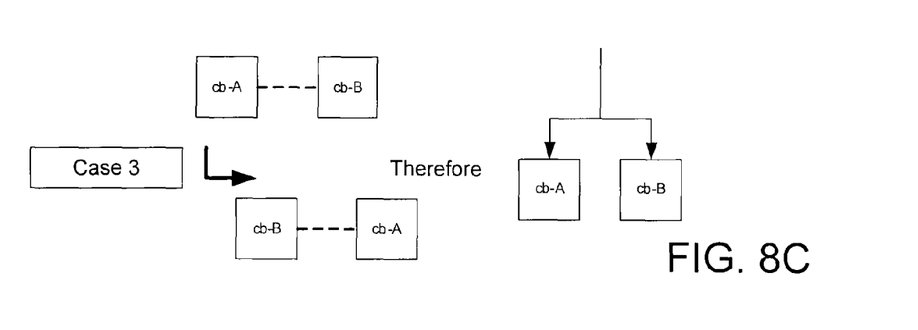
Figure 8D:
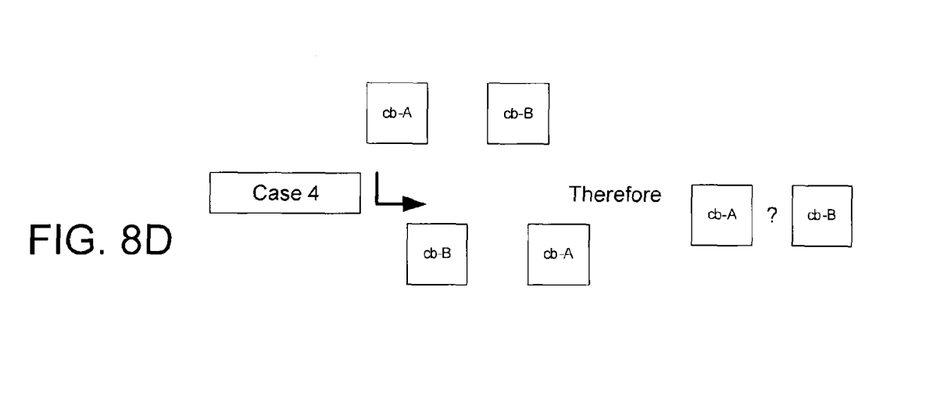

FIG. 7 shows a third example of use of the test module 34 that allows the operator to detect an electrical continuity between the point REF 48 and the point MES 50 and to conclude that the point MES 50 is not downstream of the point REF 48.

In this example, the voltmeter 49 does not indicate any voltage Vin.

The operator successfully injects an alternating current Iac and does not detect any current Iout at point 46. He concludes that there may be electrical continuity between the points REF 48 and the point MES 50, but this point MES 50 may not be downstream of the point REF 48. To make sure of this, he closes the SWdc switch, successfully injects a direct current Idc at point REF 48. If the voltmeter 49 does not indicate a voltage that increases with the flow of the current, the operator concludes that there are no filter capacitors and that there continuity between the points REF 48 and MES 50 and that the point MES 50 is not downstream of the point REF 48.

FIGS. 8A-8D diagrammatically show the steps of an example of an algorithm that makes it possible to obtain an electrical diagram of a panel using tests carried out by an operator.

The algorithm unfolds by distinguishing four different cases:

Case 1: B is downstream of A (FIG. 8A)
  It is tested that the input of B is connected downstream to the output of A. The position of B downstream of A in the diagram is directly validated.

Case 2: A is downstream of B (FIG. 8B):
  It is tested that the input of B is connected to the output of A, but is not downstream of A. In case of uncertainty, the test B-A must be carried out, which consists in testing that the input of A is connected downstream of the output of B. The position of A downstream of B in the diagram is then directly validated.

Case 3: A and B are connected in parallel (neither downstream, or upstream) (FIG. 8C):
  It is tested that the input of B is connected to the output of A, but is not downstream of A. In case of uncertainty, the test B-A must be carried out which consists in testing that the input of A is connected to the output of B, but is not downstream of B.
  It is concluded that A and B are in parallel.

Case 4: A and B are not in electrical connection (FIG. 8D):
  It is tested that the input of B is not connected to the output of A. In case of uncertainty, the test B-A must be carried out which consists in testing that the input of A is not connected to the output of B.
  It is concluded that there is no direct link between A and B. Either an element in series is blocking the current, or they do not belong to the same circuit.

Figure 9A:
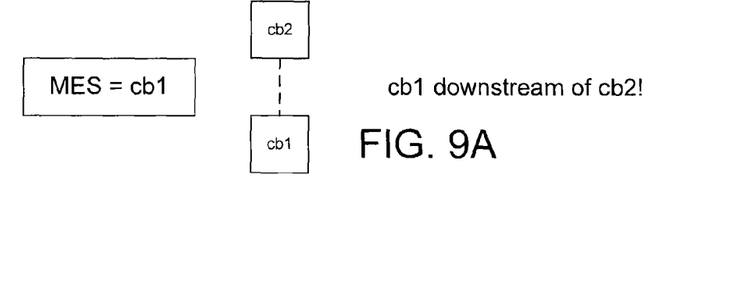
FIGS. 9A-9D, 10A-10C, and 11A-11B diagrammatically show three series of tests to be carried out in order to reconstruct the electrical diagram of an electrical panel.
Figure 9B:
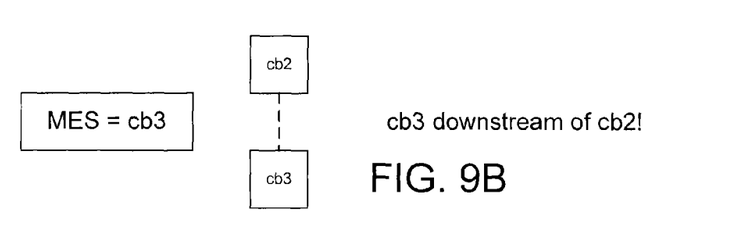
Figure 9C:
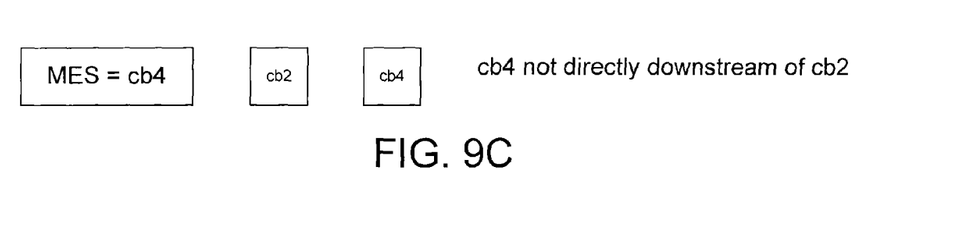

FIGS. 9A-9C diagrammatically show three series of tests that make it possible to reconstruct the electrical diagram of a panel comprising four circuit breakers CB1, CB2, CB3, and CB4 identified by the method according to the invention. In this example, the circuit breaker CB1 is open.

In the first series of tests it is considered that the point REF is CB2, and it is considered that the point MES is successively CB1, CB3 and CB4

From the first test of this first series (FIG. 9A) (MES=CB1), it is concluded that CB1 is downstream of CB2.

From the second test of this first series (FIG. 9B) (MES=CB3), it is concluded that CB3 is downstream of CB2.

From the third test of this first series (FIG. 9C) (MES=CB4), it is concluded that CB4 does not have an electrical connection with CB2.

Figure 9D:
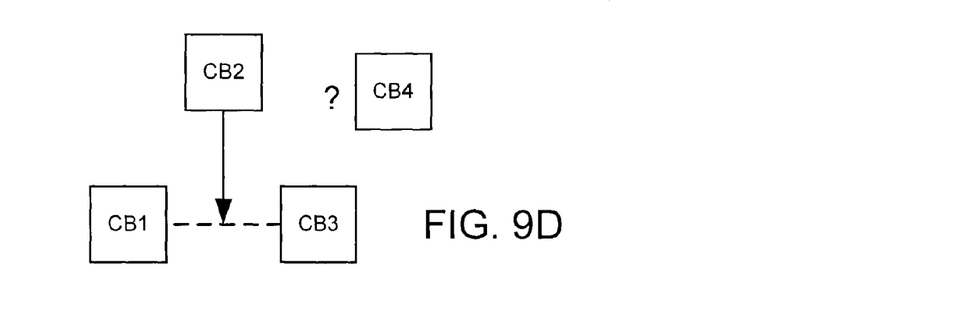

The resulting diagram is provided in FIG. 9D.

Figure 10A:
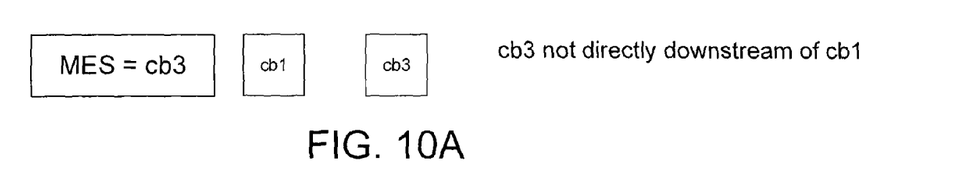
Figure 10B:
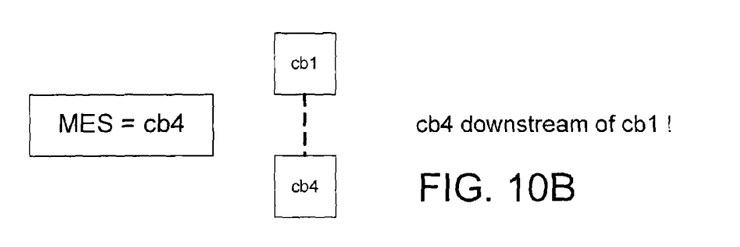

In the second series of tests it is considered that the point REF is CB1, and it is considered that the point MES is successively CB3 and CB4

From the first test of this second series (FIG. 10A) (MES=CB3), it is concluded that CB3 is not directly downstream of CB1.

From the second test of this second series (FIG. 10B) (MES=CB4), it is concluded that CB4 is downstream of CB1.

Figure 10C:
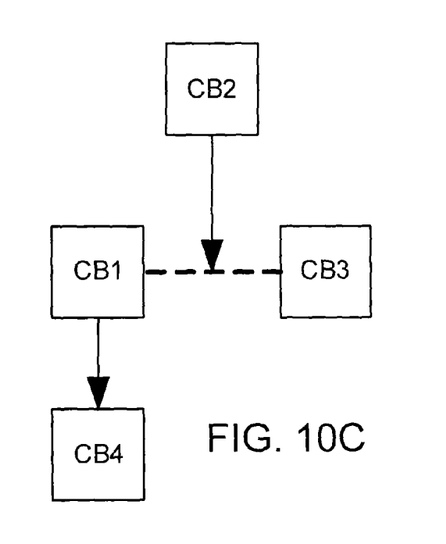

The resulting diagram is provided in FIG. 10C.

Figure 11A:
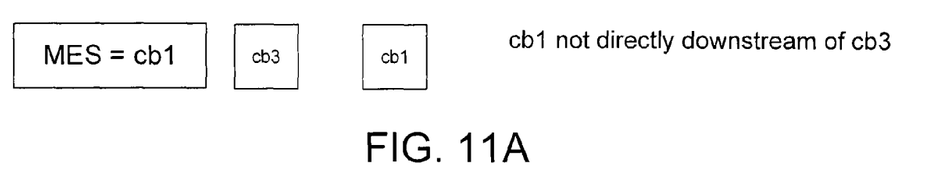

In the third series of tests it is considered that the point REF is CB3, and that the point MES is CB1.

From the single test of this third series (FIG. 11A) (MES=CB1), it is concluded that CB1 is not directly downstream of CB3.

Following the test 10A and 11A, it is concluded that CB1 and CB3 are in parallel.

Figure 11B:
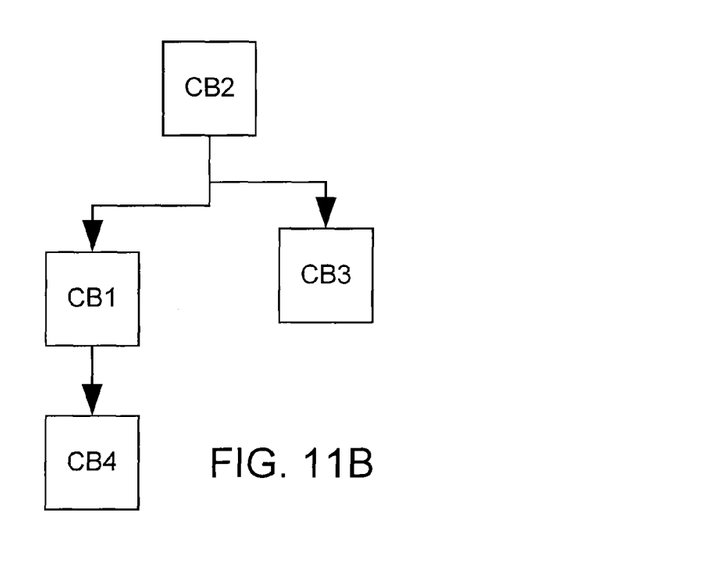

The final electrical diagram that results from the three series of tests is provided in FIG. 11B.

It is observed that out of the twelve possible tests, six tests were sufficient, with three operations of displacement of the fixed point REF.

The device according to the invention further comprises a communication module 38 intended to transmit the tree structure generated to a remote processing unit that comprises a computer programme able to reconstitute the electrical diagram of the installation.

Note that said processing unit can be integrated into the device according to the invention. In this case, the reconstitution of the electrical diagram of the installation using the tree structure of the electrical connections of the elements identified and the position of each element in said tree structure can be produced locally by an installer without having to transmit the tree structure to the remote processing unit. The electrical diagram reconstituted can then be sent to a production unit in order to manufacture or supplement the electrical panel of the installation.

In a particular embodiment of the invention, the image capturing unit 30, the image processing unit 32, the test module 34, the calculation model 36 and the communication module 38 are integrated into a tablet further comprising a memory that comprises a man-machine interface (MMI) intended to guide the installer in the order to the measurements to be taken, in order to automatically reconstitute the diagram, by limiting the number of measurements required.

The method according to the invention as such makes it possible to considerably reduce the time required to produce an electrical diagram of an existing panel while suppressing the errors of taking notes manually.

The invention claimed is:

1. A method for reconstituting a diagram of an electrical installation comprising a plurality of electrical elements connected to a source of power via protective elements arranged in an electrical panel, the method comprising:
  identifying wired electrical elements of the electrical installation using the electrical panel,
  automatically determining a tree structure of the electrical connections of the identified wired electrical elements and position of each identified wired electrical element in said tree structure, and
  generating an electrical diagram of the electrical installation using the automatically determined tree structure of the electrical connections and the position of each identified wired electrical element in said tree structure,
  wherein said automatically determining the tree structure of the electrical connections includes:
  locating at least one output terminal and at least one input terminal on each identified wired electrical element,
  verifying electrical continuity between the output terminal of the a first identified wired electrical element and the input terminal of a second identified wired electrical element, and
  determining a relative position of the second identified wired electrical element with respect to the first identified wired electrical element.

2. A method according to claim 1,
  wherein the electrical continuity between the output terminal of the first identified wired electrical element and the input terminal of the second identified wired electrical element is verified by detection of a current injected on the output terminal of the first identified wired electrical element, and wherein the relative position of the second identified wired electrical element with respect to the first identified wired electrical element is determined by current measurement at a test point located downstream of said output terminal of the first identified wired electrical element.

3. A method according to claim 1, wherein the identification of the wired electrical elements is carried out manually.

4. A method according to claim 1, wherein the identification of the wired electrical elements is carried out automatically by image recognition using a photo of the electrical panel.

5. A tablet comprising a test module and memory comprising a computer program containing instructions the to perform the method according to claim 1.

6. A computer program stored on a non-transitory computer-readable recording medium and comprising instructions, that when excepted by a computer, cause the method according to claim 1 to be performed.

7. A device for reconstituting a diagram of an electrical installation comprising a plurality of electrical elements connected to a power source via protective elements arranged in an electrical panel, the device comprising:
  an image capturing unit,
  an image processing unit to identify wired electrical elements of the electrical installation using an image of the electrical panel from the image capturing unit,
  a test module to verify electrical continuity between an output of a first identified wired electrical element and an input of a second identified wired electrical element to determine a relative position of the second element with respect to the first element, and
  a calculation module to automatically determine a tree structure of the electrical connections of the identified wired electrical elements and position of each identified wired electrical element in said tree structure to generate an electrical diagram of the electrical installation using the automatically determined tree structure.

8. The device according to claim 7, wherein the test module comprises: an electric current generator to inject a direct current Idc or an alternating current Iac on the output terminal of the first identified wired electrical element on the electrical panel, a voltmeter, a first ammeter, and a second ammeter.

9. The device according to claim 8, further comprising a communication module to transmit the generated tree structure to a processing unit comprising a computer program to reconstitute the electrical diagram of the electrical installation.

10. A test module integrated into the device of claim 8 for reconstituting a diagram of an electrical installation comprising a plurality of electrical elements connected to a power source via protective elements arranged in an electrical panel, the test module comprising: an electric current generator to inject a direct Idc or alternating Iac electrical current on an output terminal of the first identified wired electrical element on the electrical panel, a voltmeter, a first ammeter, and a second ammeter.

* * * * *